Sept. 21, 1937. E. BOWDEN ET AL 2,093,411
PROTECTIVE COATING AND SHEATHING FOR CABLES, PIPES, AND THE LIKE
Filed Sept. 11, 1934
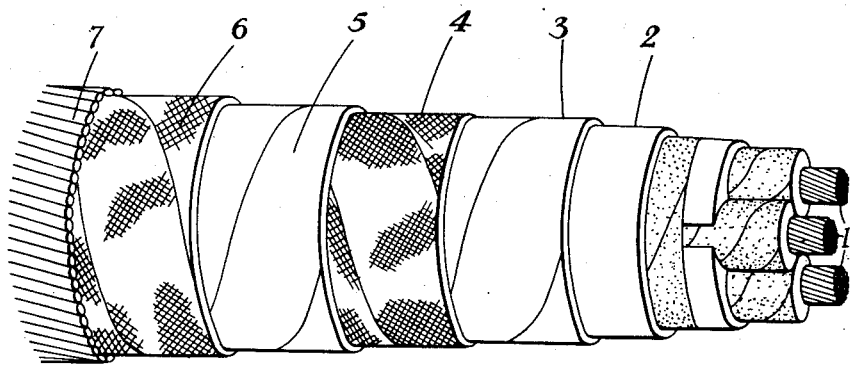
INVENTORS
Edward Bowden, and
Donal O'Duffy
BY
Byrnes, Stebbins & Blenko
their ATTORNEYS Patented Sept. 21, 1937

2,093,411

UNITED STATES PATENT OFFICE 2,093,411

PROTECTIVE COATING AND SHEATHING FOR CABLES, PIPES, AND THE LIKE

Edward Bowden, London, and Donal O'Duffy, Middlesex, England, assignors to The Enfield Cable Works Limited, London, England, a British company Application September 11, 1934, Serial No. 743,550 In Great Britain September 20, 1933

4 Claims. (Cl. 154—41)

This invention relates to corrosion-resistant protective sheathings for wires, cables, rods, pipes, tubes and other analogous articles. Such protective sheathings, have previously been formed of bituminous materials reinforced by fibrous material which supplies the necessary strength to the composition and assists in maintaining the protected article centrally in its protective sheathing. In sheathings of this type, however, owing to the plastic nature of the bituminous material, the weight of the article and changes in temperature and other causes, it frequently happens that the fibrous material provides a multiplicity of small paths for the passage through the sheathing of moisture or other deleterious gases or liquids. It is an object of the present invention to provide a protective sheath of this general type through which the passage of moisture and other fluids is entirely prevented.

In accordance with the present invention, we provide a protective sheath or covering for wires, cables, pipes and other articles such as hereinbefore indicated, which comprises a fibrous reinforced sheathing of a suitable bituminous material in direct contact with a sheathing of rubber or rubber-like material of the kind hereinafter defined.

It has previously been considered inadvisable to allow rubber to be in contact with materials of an oily nature, such as bituminous materials, since these have a softening effect upon rubber. We have discovered, however, that by regulating the relative quantity of rubber and of such bituminous material, the softening of the rubber may be controlled and that the rubber, when softened to a desired degree, will act as a waterproof material. Accordingly in constructing the improved protective sheath, we so proportion the relative quantities of rubber or rubber-like material and bituminous material that the rubber or rubber-like material is substantially permanently softened to a desired extent to serve as a waterproof layer to prevent the fibrous material from forming a continuous path from the exterior to the interior of the protective sheath. Conveniently, this proportioning of the rubber and bituminous materials is effected by making the fibrous reinforced bituminous sheathing and the rubber or rubber-like sheathing of suitable relative thickness.

As used in this specification and the accompanying claims, the expression "rubber" means pure and compounded natural and artificial rubber which is unvulcanized and does not contain vulcanizing ingredients and on which materials of an oily nature, such as are present in the class of bituminous materials defined hereinafter, exert a substantially permanent softening action. It does not include pure or compounded natural or artificial rubber which has been vulcanized or which contains vulcanizing agents.

In order to provide greater security, the improved protective sheathing may comprise a series of superposed alternate layers of fibrous-reinforced bituminous material and rubber or rubber-like material, the component layers being of suitable relative thickness so as to prevent an excessive flow of the softened rubber or rubber-like material, which would cause decentralization to take place. The protective sheathing may be formed by applying in turn a layer of rubber or rubber-like material, a layer of bituminous material, and a layer of fibrous yarn or fabric. Preferably, however, the fibrous yarn is impregnated with bituminous material before its application to the article to be protected. In addition to protecting the article from corrosion, the improved protective sheathing may also serve to insulate it electrically.

Bituminous materials which are suitable for use in forming the improved protective sheathing are asphalt, petroleum residues and pitches. Jute or hemp yarns or fabrics, such as hessian, made from these materials, are very suitable for use in forming the reinforcing layers although other fibrous yarns or fabrics may be employed.

The accompanying drawing shows by way of example only, the telescoped end of an electric cable furnished with a corrosion resisting covering constructed in accordance with the invention.

The cable comprises three paper insulated conductors 1 enclosed in a circular lead sheath 2. The protective sheathing over the latter consists of a layer 3 of rubber compound applied in tape form, a layer 4 of a fabric tape impregnated with a bituminous composition, a second layer 5 of rubber compound similar to the first layer 3 and a final layer 6 of fabric impregnated with bituminous material. These layers are applied by a lapping machine. A steel wire armouring applied over the protective sheathing is indicated by 7. The rubber compound of which the layers 3 and 5 are formed may consist of the following mixture:—

| | Parts by weight |
|---|---|
| Pale crepe | 100 |
| Talc | 60 |
| Air blown asphalt | 20 | and the layers 4 and 6 may be of hessian impregnated with asphalt having a softening point, as determined by the Ball and Ring method, up to 80° C. and, at 25° C., a penetration factor greater than 40. In this case satisfactory proportioning of the rubber and bituminous materials is obtained by making the layers 3, 4, 5 and 6 all of equal radial thickness.

We claim as our invention:—

1. The process of manufacturing a continuous, corrosion resistant, protective sheath for wires, cables, rods, and other analogous articles which consists in applying to the article to be protected a wrapping in tape form of rubber compound which is unvulcanized and does not contain vulcanizing ingredients and, applying in direct contact with said covering, a fibrous reinforced sheathing of oil-containing bituminous material having a softening point as determined by the Ball and Ring method, of 50° to 80° C. and at 25° C. a penetration factor of 40 to 80, whereby the rubber is permanently softened by migration of the oily constituents.

2. The process of manufacturing a continuous, corrosion resistant, protective sheath for wires, cables, rods and other analogous articles, which comprises applying to the article to be protected a covering of an unvulcanized and unvulcanizable rubber mix and, applying in direct contact with the said covering, a fibrous reinforced sheathing of oil-containing asphalt having a softening point as determined by the Ball and Ring method of 50° to 80° C. and at 25° C. a penetration factor of 40 to 80, whereby the rubber is permanently softened by migration of the oily constituents.

3. The process of manufacturing a continuous, corrosion resistant, protective sheath for wires, cables, rods and other analogous articles, which comprises applying to the article to be protected a covering of a rubber mix comprising pale crepe, a filler, and air blown asphalt, and, applying in direct contact with the said covering, a fibrous reinforced sheathing of oil-containing asphalt having a softening point, as determined by the Ball and Ring method, of 50° to 80° C. and at 25° C., a penetration factor of 40 to 80, whereby the rubber is permanently softened by migration of the oily constituents.

4. The process of manufacturing a continuous, corrosion resistant, protective sheath for a wire, cable, rod or like article which comprises applying to the article a helical wrapping of non-fibrous tape in contact with the surface of the article and a helical wrapping of fibrous material overlying the non-fibrous tape, the non-fibrous tape consisting of an unvulcanized and unvulcanizable rubber mix and the fibrous material being impregnated with oil-containing asphalt having a softening point, as determined by the Ball and Ring method, of 50° to 80° C. and at 25° C., a penetration factor of 40 to 80, whereby the rubber is permanently softened by migration of the oily constituents.

EDWARD BOWDEN.
DONAL O'DUFFY.